(12) United States Patent
Yun et al.

(10) Patent No.: US 9,503,135 B2
(45) Date of Patent: Nov. 22, 2016

(54) SLIDING INTERMEDIATE FREQUENCY (IF) RECEIVER WITH ADJUSTABLE DIVISION RATIO AND SLIDING IF RECEPTION METHOD

(71) Applicant: Samsung Electronics Co., Ltd., Suwon-si (KR)

(72) Inventors: Seok Ju Yun, Hwaseong-si (KR);
Seong Joong Kim, Hwaseong-si (KR);
Yong Kyu Kim, Hwaseong-si (KR);
Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/640,796

(22) Filed: Mar. 6, 2015

(65) Prior Publication Data

US 2016/0065256 A1    Mar. 3, 2016

(30) Foreign Application Priority Data

Aug. 28, 2014   (KR) .................. 10-2014-0113089

(51) Int. Cl.
*H04B 1/10* (2006.01)
*H04B 1/00* (2006.01)

(52) U.S. Cl.
CPC .......... *H04B 1/1027* (2013.01); *H04B 1/0096* (2013.01); *H04B 1/10* (2013.01)

(58) Field of Classification Search
CPC .... H04B 1/1027; H04B 1/0096; H04B 1/10; H03D 3/007
See application file for complete search history.

(56) References Cited

U.S. PATENT DOCUMENTS

| 7,236,212 | B2 | 6/2007 | Carr et al. |
| 7,590,205 | B2 | 9/2009 | Zipper |
| 8,160,529 | B1 * | 4/2012 | Clement ................ H03D 7/166 455/255 |

(Continued)

FOREIGN PATENT DOCUMENTS

| JP | 11-234665 A | 8/1999 |
| JP | 2002-111526 A | 4/2002 |
| JP | 2003-318761 A * | 7/2003 ............... H04B 1/26 |

(Continued)

OTHER PUBLICATIONS

Silver, H. Ward, ed. The ARRL Handbook 2011, 2010, ARRL, 88th Ed., pp. 8.10-8.12.*

(Continued)

*Primary Examiner* — Chieh M Fan
*Assistant Examiner* — Michelle M Koeth
(74) *Attorney, Agent, or Firm* — NSIP Law

(57) ABSTRACT

A sliding intermediate frequency (IF) receiver and a sliding IF reception method are provided. A first local oscillation signal and a second local oscillation signal may be generated, based on a division ratio of a frequency of the first local oscillation signal to a frequency of the second local oscillation signal that is determined in advance so that an amount of power to be consumed or an error rate of the sliding IF receiver is optimized. A received input signal may be converted to a first IF signal, based on the first local oscillation signal, and the first IF signal may be converted to a second IF signal, based on the second local oscillation signal.

20 Claims, 12 Drawing Sheets

(56) References Cited

U.S. PATENT DOCUMENTS

| | | | |
|---|---|---|---|
| 2003/0050031 A1 | 3/2003 | Suzuki et al. | |
| 2003/0071925 A1 | 4/2003 | Kanno et al. | |
| 2005/0265483 A1* | 12/2005 | Erdogan | H03D 3/006 375/316 |
| 2009/0239492 A1* | 9/2009 | Kuga | H04B 1/28 455/260 |
| 2011/0170641 A1 | 7/2011 | Zhou et al. | |

FOREIGN PATENT DOCUMENTS

| | | |
|---|---|---|
| JP | 2003-318761 A | 11/2003 |
| JP | 2008-177737 A | 7/2008 |
| JP | 2009-100155 A | 5/2009 |
| JP | 2010-103797 A | 5/2010 |
| KR | 10-2005-0041976 A | 5/2005 |
| KR | 10-2007-0053786 A | 5/2007 |
| KR | 10-2010-0066717 A | 6/2010 |

OTHER PUBLICATIONS

Liu, Yao-Hong, et al. "A 1.9 nJ/b 2.4 GHz multistandard (Bluetooth Low Energy/Zigbee/IEEE802. 15.6) transceiver for personal/body-area networks."Solid-State Circuits Conference Digest of Technical Papers (ISSCC), 2013 IEEE International I E E E, 2013, Eindhoven, The Netherlands.*

English Machine Translation of JP-2003-318761 A, from the European Patent Office website, 34 pages.*

Liu, Yao-Hong, et al. "A 1.9 nJ/b 2.4 GHz multistandard (Bluetooth Low Energy/Zigbee/IEEE802. 15.6) transceiver for personal/body-area networks."*Solid-State Circuits Conference Digest of Technical Papers (ISSCC), 2013 IEEE International.* IEEE, 2013, Eindhoven, The Netherlands.

Wong, Alan, et al. "A 1V 5mA multimode IEEE 802.15. 6/bluetooth low-energy WBAN transceiver for biotelemetry applications." *Solid-State Circuits Conference Digest of Technical Papers (ISSCC), 2012 IEEE International.* IEEE, 2012, Abingdon, United Kingdom.

\* cited by examiner

SLIDING INTERMEDIATE FREQUENCY (IF) RECEIVER WITH ADJUSTABLE DIVISION RATIO AND SLIDING IF RECEPTION METHOD

CROSS-REFERENCE TO RELATED APPLICATION(S)

This application claims the benefit under 35 USC 119(a) of Korean Patent Application No. 10-2014-0113089, filed on Aug. 28, 2014, in the Korean Intellectual Property Office, the entire disclosure of which is incorporated herein by reference for all purposes.

BACKGROUND

1. Field

The following description relates to an apparatus and method for receiving a signal by cancelling an interference signal.

2. Description of Related Art

In a wireless transceiver, and the like, a frequency converter may be used. For example, in a wireless communication apparatus functioning both as a receiver and a transmitter, a receiver, such as, a down converter, may receive a radio frequency (RF) signal based on a telephone conversation and data communication information. The down converter may further convert a frequency of the received RF signal so that the RF signal may be input to a demodulator. Additionally, the down converter may use, as a front-end scheme of selecting a destination signal, a heterodyne scheme of converting the RF signal to an intermediate frequency (IF) signal, instead of directly converting a frequency of the RF signal to a frequency in a base band (BB).

The heterodyne scheme is gaining attention as a front-end architecture of a software radio apparatus, because the heterodyne scheme can be easily implemented at a front end of a broadband.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a sliding intermediate frequency (IF) reception method including generating a first local oscillation signal and a second local oscillation signal, based on a division ratio determined in advance of a frequency of the first local oscillation signal to a frequency of the second local oscillation signal, converting a received input signal to a first IF signal, based on the first local oscillation signal, and converting the first IF signal to a second IF signal, based on the second local oscillation signal.

The generating of the first local oscillation signal and the second local oscillation signal may include determining the division ratio so that an amount of power to be consumed is less than a threshold power.

The generating of the first local oscillation signal and the second local oscillation signal may include initializing the division ratio, increasing the division ratio when a first image rejection ratio (IRR) of the first IF signal is equal to or greater than a first threshold, and decreasing the division ratio when a second IRR of the second IF signal is equal to or greater than a second threshold.

The generating of the first local oscillation signal and the second local oscillation signal may include determining the division ratio so that an error rate of a signal obtained by processing the received input signal is less than a threshold error rate.

The generating of the first local oscillation signal and the second local oscillation signal may include measuring error rates for each value of the division ratio while increasing the division ratio sequentially from a first value to a second value, and determining, as the division ratio, a value corresponding to a minimum error rate among the measured error rates.

The generating of the first local oscillation signal and the second local oscillation signal may include detecting an interference signal, and determining the division ratio, based on the interference signal.

The generating of the first local oscillation signal and the second local oscillation signal may include increasing the division ratio when a magnitude of a first image signal included in a signal obtained by filtering the first IF signal is greater than a carrier-to-noise ratio (CNR), and decreasing the division ratio when a magnitude of a second image signal included in a signal obtained by filtering the second IF signal is greater than the CNR.

The generating of the first local oscillation signal and the second local oscillation signal may include dividing the first local oscillation signal at the division ratio, to generate the second local oscillation signal.

The converting of the received input signal to the first IF signal may include performing filtering on the received input signal in a band, and converting the filtered input signal to the first IF signal.

The converting of the first IF signal to the second IF signal may include performing filtering on the second IF signal in a base band (BB).

In another general aspect, there is provided a sliding IF receiver including an oscillator configured to generate a first local oscillation signal and a second local oscillation signal, based on a division ratio determined in advance of a frequency of the first local oscillation signal to a frequency of the second local oscillation signal, a first frequency converter configured to convert a received input signal to a first IF signal, based on the first local oscillation signal, and a second frequency converter configured to convert the first IF signal to a second IF signal, based on the second local oscillation signal.

The sliding IF receiver may further include an oscillation controller configured to determine the division ratio so that an amount of power to be consumed in the sliding IF receiver is less than a threshold power.

The sliding IF receiver may further include an oscillation controller configured to initialize the division ratio, to increase the division ratio when a first IRR of the first IF signal is equal to or greater than a first threshold, and to decrease the division ratio when a second IRR of the second IF signal is equal to or greater than a second threshold.

The sliding IF receiver may further include an oscillation controller configured to determine the division ratio so that an error rate of a signal obtained by processing the received input signal is less than a predetermined threshold error rate.

The sliding IF receiver may further include an oscillation controller configured to measure error rates for each value of the division ratio while increasing the division ratio sequentially from a first value to a second value, and to determine, as the division ratio, a value corresponding to a minimum error rate among the measured error rates.

The sliding IF receiver may further include an interference detector configured to detect an interference signal, and an oscillation controller configured to determine the division ratio based on the interference signal.

The sliding IF receiver may further include an oscillation controller configured to increase the division ratio when a magnitude of a first image signal included in a signal obtained by filtering the first IF signal is greater than a CNR, and to decrease the division ratio when a magnitude of a second image signal included in a signal obtained by filtering the second IF signal is greater than the CNR.

The oscillator may include a divider configured to divide the first local oscillation signal at the division ratio, to generate the second local oscillation signal.

The sliding IF receiver may further include a first filter configured to perform filtering on the received input signal in a band, and a second filter configured to perform filtering on the second IF signal in a BB.

The second frequency converter may include an in-phase converter configured to convert the first IF signal to an in-phase signal, and a quadrature converter configured to convert the first IF signal to a quadrature signal. The second IF signal may include the in-phase signal and the quadrature signal.

Other features and aspects will be apparent from the following detailed description, the drawings, and the claims.

Figure 1:
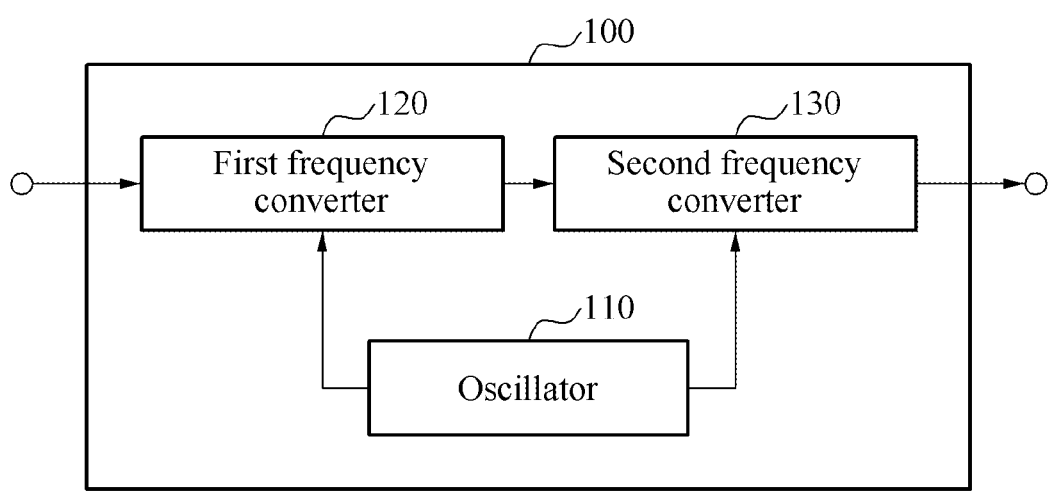
FIGS. 1 and 2 are diagrams illustrating examples of a configuration of a sliding intermediate frequency (IF) receiver.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 2:
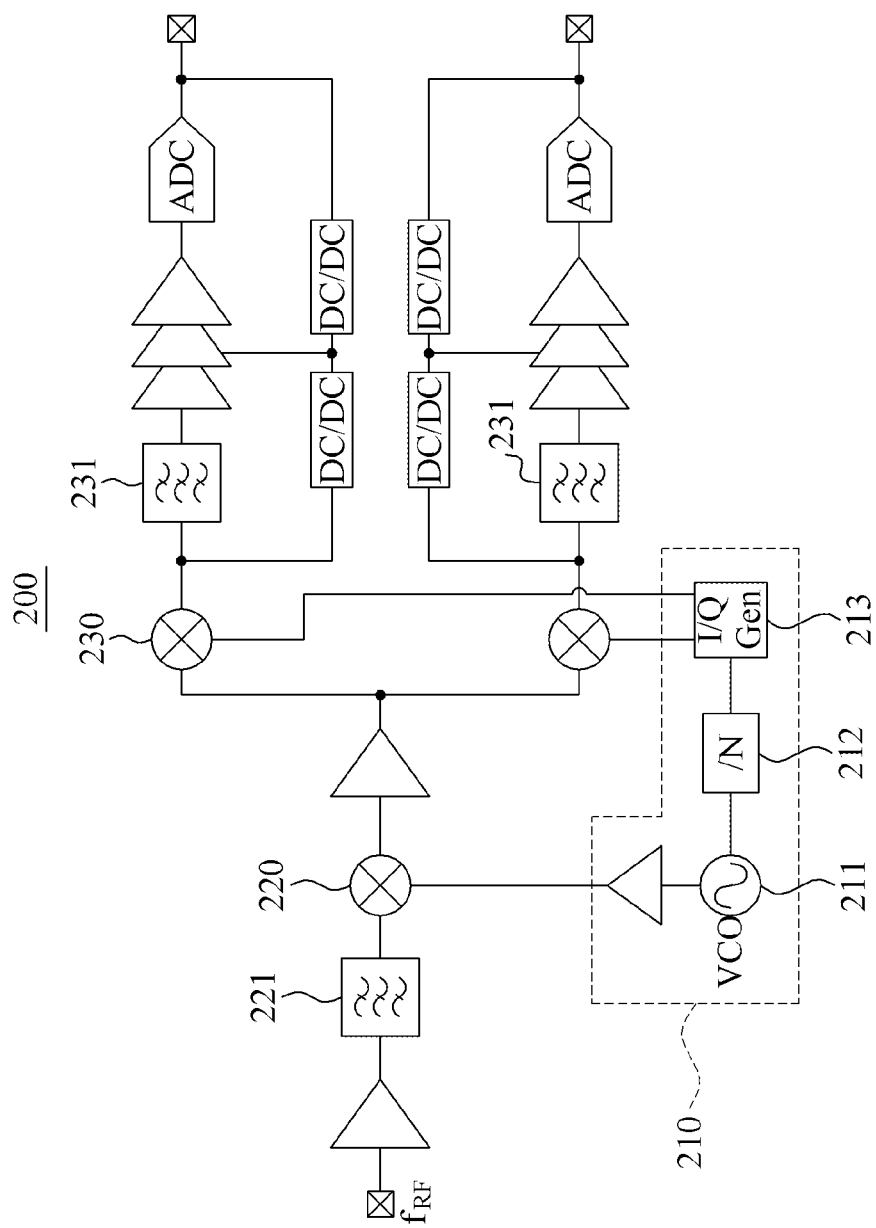

FIGS. 1 and 2 are diagrams illustrating examples of a configuration of a sliding intermediate frequency (IF) receiver.

Referring to FIG. 1, a sliding IF receiver 100 includes an oscillator 110, a first frequency converter 120, and a second frequency converter 130.

The oscillator 110 may generate a first local oscillation signal and a second local oscillation signal, based on a predetermined division ratio. A division ratio may refer to a ratio of a frequency of a first local oscillation signal to a frequency of a second local oscillation signal. The division ratio, the frequency of the first local oscillation signal, and the frequency of the second local oscillation signal may be represented, for example, by N, $f_{LO1}$, and $f_{LO2}$, respectively. For example, the division ratio N may be represented as "$f_{LO1}/f_{LO2}$," and N may be an integer equal to or greater than "1." The division ratio may be referred to as a "sliding number."

The first frequency converter 120 may convert a received input signal (for example, a radio frequency (RF) signal) to a first IF signal, based on the first local oscillation signal. For example, a frequency of the input signal may be included in a predetermined band (for example, an RF band). Additionally, a frequency of the first IF signal may be included in a band between a predetermined band and a base band (BB).

The second frequency converter 130 may convert the first IF signal to a second IF signal, based on the second local oscillation signal. For example, a frequency of the second IF signal may be included in the BB.

In an example, a sliding IF receiver may secure an optimum image rejection performance, based on an image rejection ratio (IRR) of each of two filters and an image size of a channel. Additionally, the sliding IF receiver may improve power consumption and reception sensitivity, by generating a local oscillation signal based on a predetermined division ratio.

The sliding IF receiver may be adapted for use, for example, in an RF integrated circuit (IC), an ultra low power receiver, an application requiring a high IRR, or a wearable device with low power connectivity as a low-power RFIC solution requiring a high image rejection.

FIG. 2 illustrates an example of a configuration of a sliding IF receiver 200.

The sliding IF receiver 200 may convert a frequency of an input signal to a BB, based on a first local oscillation signal and a second local oscillation signal generated by dividing the first local oscillation signal. The first local oscillation signal may be output from a single voltage-controlled oscillator (VCO) 211.

Figure 4:
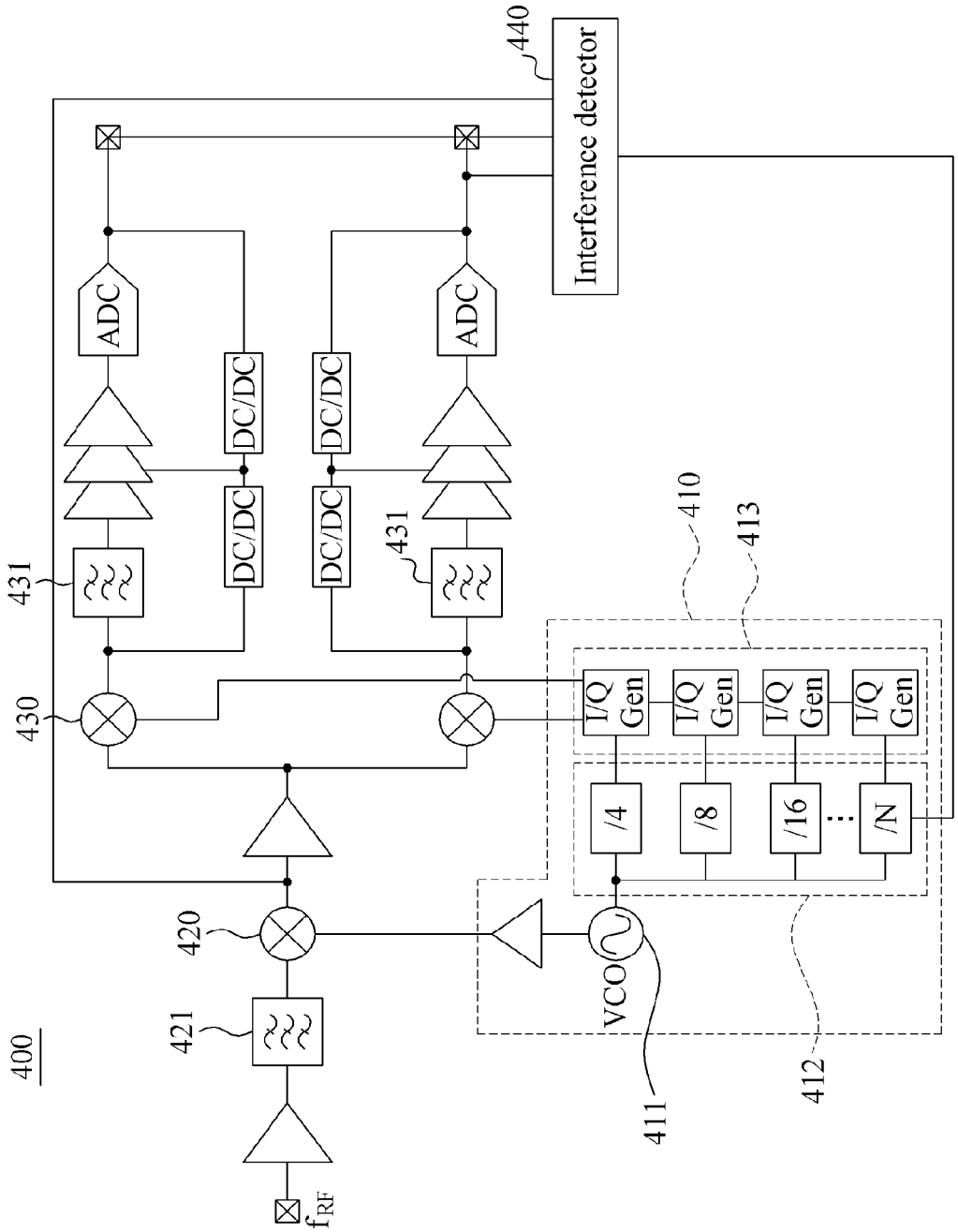

Referring to FIG. 2, an oscillator 210 may include the VCO 211, a divider 212, and an in-phase/quadrature (I/Q) generator 213. In FIGS. 2 and 4, an I/Q generator is represented by "I/Q Gen." The divider 212 may divide the first local oscillation signal output from the VCO 211 at a predetermined division ratio, to generate the second local oscillation signal. The I/Q generator 213 may generate an in-phase oscillation signal, and a quadrature oscillation signal, based on the second local oscillation signal.

The quality of a local oscillation signal (for example, the first local oscillation signal, and the second local oscillation signal) used to convert a frequency of an input signal may need to be very accurate so as to obtain high image rejection performance. However, to generate an accurate local oscillation signal at a high frequency, high power consumption may be required. To implement a low power receiver, a local oscillation signal may need to be generated at a low frequency.

For example, the sliding IF receiver 200 may perform first frequency conversion to convert an input signal with a frequency $f_{RF}$ to a first IF signal with a frequency $f_{IF}$, based on a single first local oscillation signal that is not represented in an I/Q form. The sliding IF receiver 200 may perform second frequency conversion to convert the first IF signal in an IF band including the frequency $f_{IF}$ to a frequency in a BB or a direct current (DC), based on an in-phase oscillation signal and a quadrature oscillation signal generated from a second local oscillation signal.

Because the sliding IF receiver 200 may generate the in-phase oscillation signal and the quadrature oscillation signal at a low frequency band (for example, the IF band), power consumption may be reduced to generate the second local oscillation signal. Accordingly, the sliding IF receiver 200 may be suitable for low power reception. However, due to frequency down conversion performed twice by the sliding IF receiver 200, the input signal may be degraded by an image signal.

A second frequency converter 230 may include an in-phase converter, and a quadrature converter. The in-phase converter may convert the first IF signal to the in-phase signal. The quadrature converter may convert the first IF signal to the quadrature signal. The in-phase converter and the quadrature converter may operate, based on the in-phase oscillation signal and the quadrature oscillation signal generated by the I/Q generator 213, respectively. The second IF signal may include the in-phase signal and the quadrature signal.

In the following description, the sliding IF receiver 200 may select a frequency difference between the first local oscillation signal and the second local oscillation signal by adjusting the division ratio and accordingly, minimizing power consumption while maximizing removal of an image signal. Also, a reception sensitivity of the sliding IF receiver 200 may be enhanced by removing an image signal at low power.

The sliding IF receiver 200 may use a scheme of performing twice frequency down conversion (for example, a double conversion scheme). The sliding IF receiver 200 further includes a first frequency converter 220, the second frequency converter 230, a first filter 221, and a second filter 231. The first frequency converter 220 and the second frequency converter 230 may perform twice frequency conversion, and the first filter 221 and the second filter 231 may cancel an interference signal. A first local oscillation signal and a second local oscillation signal for double conversion may be generated from a local oscillation signal of a single VCO.

The first local oscillation signal may have a frequency output from a VCO, and the second local oscillation signal may have a frequency generated by dividing the frequency output from the VCO at a division ratio N using a divider. A frequency $f_{LO1}$ of the first local oscillation signal, and a frequency $f_{LO2}$ of the second local oscillation signal to operate the first frequency converter 220 and the second frequency converter 230 may be represented in Equations 1 through 3 shown below.

$$f_{LO1} \approx \left(\frac{N}{N+1}\right) f_{RF} \qquad \text{Equation 1}$$

$$f_{LO2} \approx \frac{f_{RF}}{N+1} \qquad \text{Equation 2}$$

$$f_{IF} = f_{RF} - f_{LO1} - f_{LO2} \qquad \text{Equation 3}$$

In Equations 1 through 3, $f_{LO1}$ corresponds to the frequency of the first local oscillation signal, $f_{LO2}$ corresponds to the frequency of the second local oscillation signal, and N corresponds to a division ratio, that is, a ratio of the frequency $f_{LO1}$ to the frequency $f_{LO2}$. Additionally, $f_{RF}$ corresponds to a frequency of a received input signal, and $f_{IF}$ corresponds to an IF. In Equations 1 and 2, when the first frequency converter 220 operated by the frequency $f_{LO1}$ is a direct conversion receiver (DCR), and when an equals sign (=) is changed to an approximately equals sign ($\approx$), an approximate value of each of the frequencies $f_{LO1}$ and $f_{LO2}$ may have an error corresponding to the IF $f_{IF}$.

In Equations 1 through 3, when the second local oscillation signal is generated based on the first local oscillation signal, an N-times frequency relationship between the frequencies $f_{LO1}$ and $f_{LO2}$ may be formed using the divider 212 (for example, an N divider). For example, the frequency $f_{LO1}$ may be obtained by multiplying the frequency $f_{LO2}$ by N ($f_{LO1}=N \times f_{LO2}$).

The first filter 221 may correspond to an RF filter allowing a signal in a predetermined band (for example, a band including the frequency $f_{RF}$) to pass, and the second filter 231 may correspond to a filter allowing a signal in a BB to pass. The first filter 221 may have a broadband characteristic, for example a low quality (Q) factor, and the second filter 231 may have a narrowband characteristic, for example a high Q factor.

For example, the first filter 221 may perform filtering on the received input signal in the predetermined band, and the second filter 231 may perform filtering on the second IF signal in the BB. A first image signal may be removed by the first filter 221 in a front end of the first frequency converter 220, and a second image may be removed by the second filter 231 in a rear end of the second frequency converter 230.

When a value of a division ratio N is changed due to a characteristic of the filtering of the first filter 221 and the second filter 231, an IRR of the first image signal and an IRR of the second image signal may be changed, which will be further described with reference to FIGS. 8 and 9. Hereinafter, the IRR of the first image signal and the IRR of the second image signal may be referred to as a first IRR and a second IRR, respectively.

The sliding IF receiver 200 of FIG. 2 may further include a buffer, an amplifier, an analog-to-digital converter (ADC), and the like, based on a design.

Figure 3:
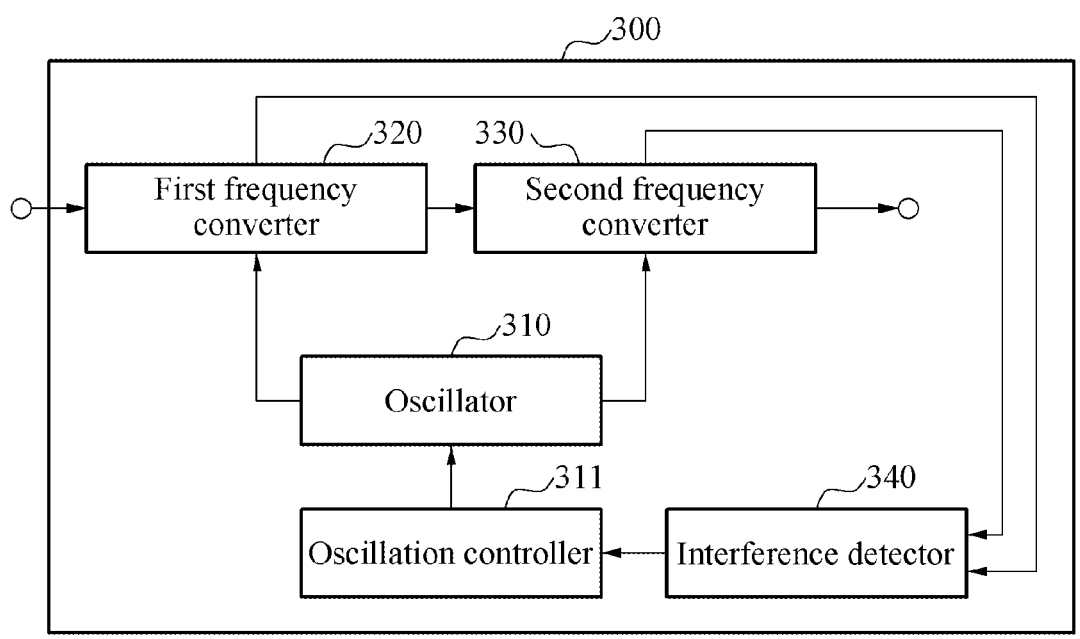
FIGS. 3 and 4 are diagrams illustrating examples of a configuration of a sliding IF receiver including an interference detector.

FIGS. 3 and 4 are diagrams illustrating examples of a configuration of a sliding IF receiver including an interference detector.

Referring to FIG. 3, a sliding IF receiver 300 includes an oscillator 310, an oscillation controller 311, a first frequency converter 320, a second frequency converter 330, and an interference detector 340. The first frequency converter 320 and the second frequency converter 330 may operate similarly to the first frequency converter 120 and the second frequency converter 130 of FIG. 1.

The oscillator 310 may generate a first local oscillation signal and a second local oscillation signal, based on a division ratio determined in advance by the oscillation controller 311. The oscillator 310 is separated from the oscillation controller 311, as shown in FIG. 3, however, this feature is not limited thereto. For example, the oscillator 310 may include the oscillation controller 311.

The oscillation controller 311 may determine the division ratio. In an example, the oscillation controller 311 may determine a division ratio in advance so that an amount of power to be consumed in the sliding IF receiver 300 may be less than a predetermined power threshold. In another example, the oscillation controller 311 may determine a division ratio so that an error rate of a signal obtained by processing a received input signal may be less than a predetermined threshold error rate. The error rate may refer to a rate of an error occurring in a final signal (for example, a result signal obtained by finally processing the received input signal). The error rate may include, for example, a bit error rate (BER), a packet error rate (PER), or other error rates known to one of ordinary skill in the art. In still another example, the oscillation controller 311 may determine a division ratio in advance, based on an interference signal.

The oscillation controller 311 may control the division ratio. For example, the oscillation controller 311 may control the division ratio used to generate a second local oscillation signal from a first local oscillation signal. The oscillation controller 311 will be further described with reference to FIG. 4.

The interference detector 340 may detect an interference signal included in an input signal. The interference signal may include, for example, a first image signal and a second image signal that are included in the input signal. The first image signal and the second image signal may be generated during conversion of the input signal to a first IF signal and a second IF signal by the first frequency converter 320 and the second frequency converter 330.

The interference detector 340 may detect an interference signal (for example, the first image signal) from the first IF signal output by the first frequency converter 320. The interference detector 340 may also detect another interference signal (for example, the second image signal) from the second IF signal output by the second frequency converter 330.

The sliding IF receiver 300 may optimize an image signal rejection performance by controlling a division ratio of a first local oscillation signal and a second local oscillation signal, based on an interference signal. Additionally, the sliding IF receiver 300 may maintain an optimized reception performance by selectively controlling a frequency of an image signal to be rejected while maintaining low power.

FIG. 4 illustrates an example of a configuration of a sliding IF receiver 400.

A first filter 421, a first frequency converter 420, a second frequency converter 430, a second filter 431, and a VCO 411 of FIG. 4 may operate as described above with reference to FIG. 2.

Referring to FIG. 4, an oscillator 410 includes the VCO 411, a plurality of dividers 412, and a plurality of I/Q generators 413.

The dividers 412 (for example, a divider chain) and the I/Q generators 413 may select a path from among a plurality of parallel paths, based on a control signal of an oscillation controller (not illustrated), and may adaptively change a value of a division ratio N based on an environment, for example, an image signal, or a filter performance. The dividers 412 may be connected to the I/Q generators 413, respectively. The dividers 412 may generate second local oscillation signals at different division ratios, as shown in FIG. 4, and a divider corresponding to a value of the division ratio N determined by the oscillation controller may be selected.

Additionally, an interference detector 440 may monitor a magnitude of a first image signal output from the first frequency converter 420, and a magnitude of a second image signal output from the second frequency converter 430. The oscillation controller may select a path based on an interference signal detected by the interference detector 440, and may control the value of the division ratio N.

Figure 5:
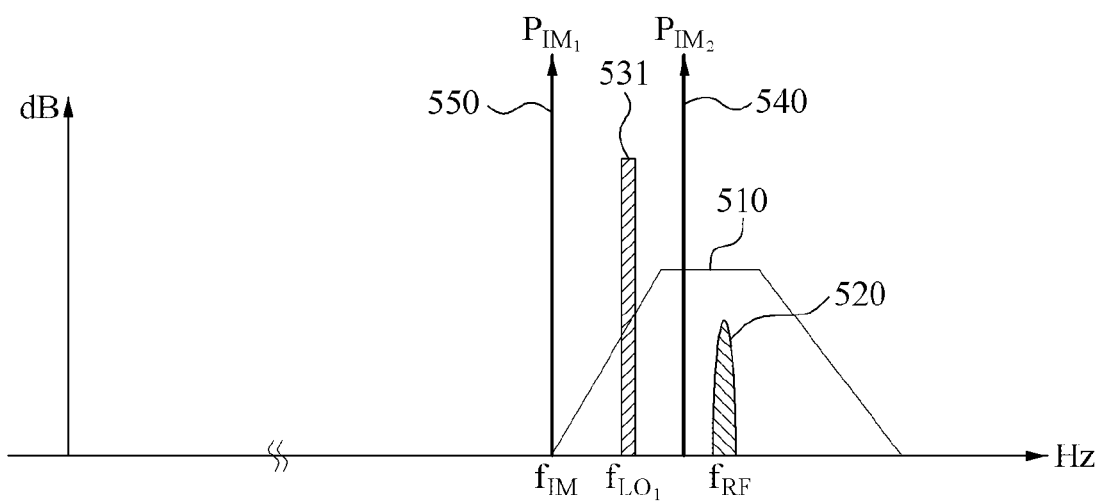
FIGS. 5 through 7 are diagrams illustrating examples of a process of processing an image signal in a sliding IF receiver.
Figure 6:
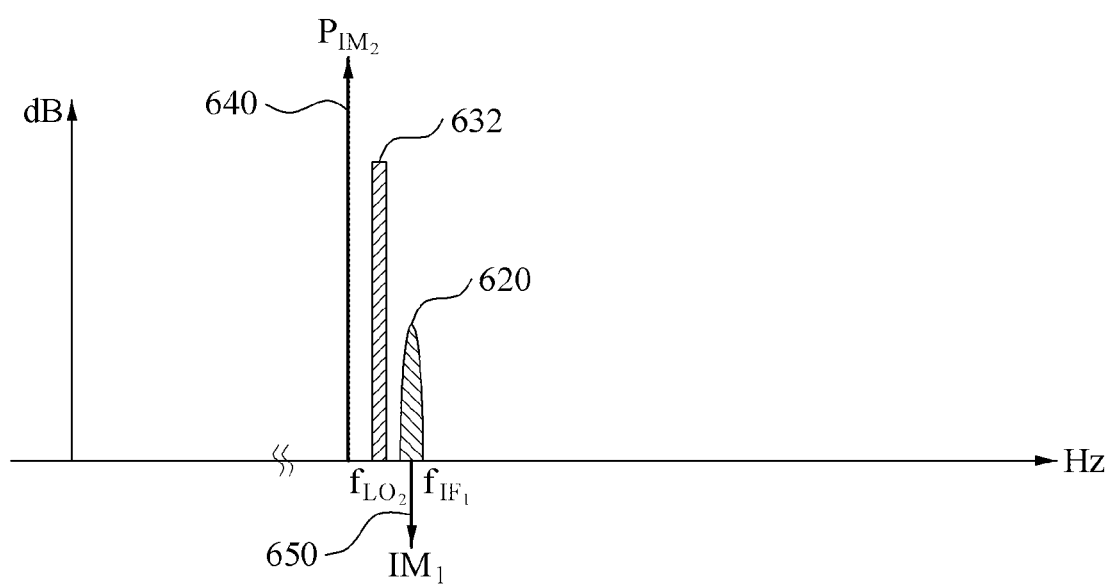
Figure 7:
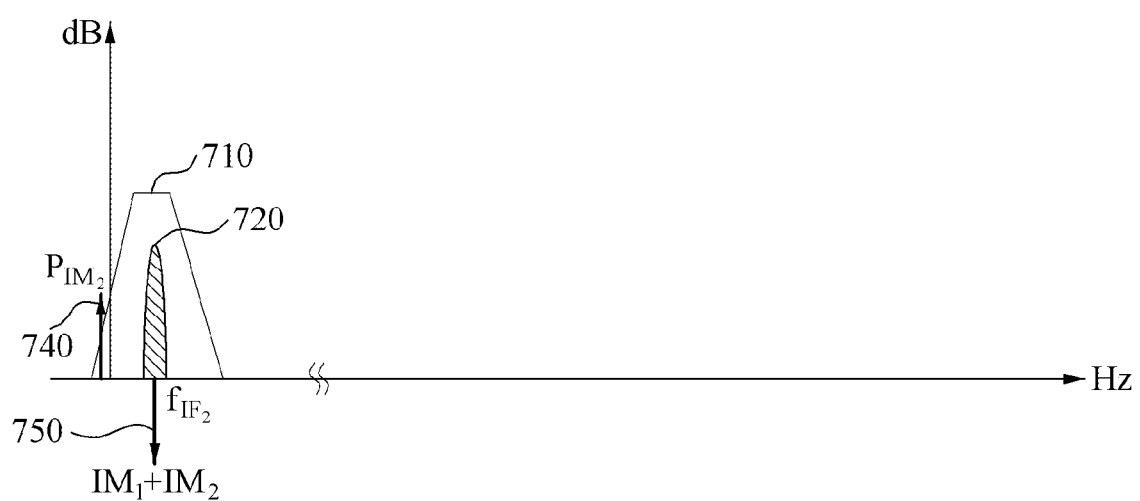

FIGS. 5 through 7 are diagrams illustrating examples of a process of processing an image signal in a sliding IF receiver.

FIG. 5 illustrates a channel environment in which a first image signal 550 and a second image signal 540 exist in a band adjacent to an input signal 520. In FIG. 5, $P_{IM1}$, $P_{IM2}$, $f_{IM}$, and $f_{LO1}$ represent a magnitude of the first image signal 550, a magnitude of the second image signal 540, a frequency of the first image signal 550, and a frequency of a first local oscillation signal 531, respectively. A first filter 221 may allow a signal in a predetermined band 510 to pass, and may have a broadband characteristic.

In the predetermined band 510 of the first filter 221 having the broadband characteristic, when a value of a division ratio N increases, a difference between the frequencies $f_{RF}$ and $f_{IM}$ decreases. Accordingly, it may be difficult for the first filter 221 to remove the first image signal 550. Conversely, when the value of the division ratio N decreases, a difference between the frequency $f_{RF}$ and a frequency of the second image signal 540 increases, which may allow the first filter 221 to easily remove the first image signal 550.

FIG. 6 illustrates a channel environment in which a first IF signal 620 converted from an input signal, and a second image signal 640 are located close to each other. In FIG. 6, $P_{IM2}$, $f_{LO2}$, $f_{IF1}$, and $IM_1$ represent a magnitude of the second image signal 640, a frequency of a second local oscillation signal 632, a frequency of the first IF signal 620, and a first image signal 650 included in the first IF signal 620, respectively. The first image signal 650 may remain in the first IF signal 620, instead of being removed by a first filter.

FIG. 7 illustrates an example in which a second image signal 740 is removed from a second IF signal 720 converted from a first IF signal. In FIG. 7, $P_{IM2}$, $f_{IF2}$, and $IM_1+IM_2$ represent a magnitude of the second image signal 740 before filtering is performed by a second filter 231, a frequency of the second IF signal 720, and an interference signal 750 included in the second IF signal 720, respectively.

In a BB 710 of a second filter 231 having a narrowband characteristic, when a value of a division ratio N increases, a frequency of a second local oscillation signal may decrease, which may allow the second filter 231 to easily remove the second image signal 740. By facilitating removal of the second image signal 740, power consumption may be reduced due to a low frequency of the second local oscillation signal. Conversely, when the value of the division ratio N decreases, the frequency of the second local oscillation signal may increase and accordingly, it may be difficult for the second filter 231 to remove the second image signal 740. Additionally, when the frequency of the second local oscillation signal increases, power consumption may be relatively increased.

As shown in FIGS. 5 through 7, an image signal may be generated in a band between the frequencies $f_{LO1}$ and $f_{IF1}$, and a band between the frequencies $f_{LO2}$ and $f_{IF2}$. For example, a difference in a frequency between an image band and a received input signal may be represented by "$2(f_{RF}-f_{LO1})$," and "$2(f_{IF2}-f_{LO2})$." The above frequency difference may be reduced when the frequencies $f_{LO2}$ and $f_{LO2}$ are reduced. Accordingly, when the value of the division ratio N decreases, a distance between an image frequency and a signal band including an input signal may increase.

In an example, when a difference in a frequency between the first image signal and a signal band including an input signal increases, it may be advantageous to remove an image. Accordingly, when the value of the division ratio N decreases, the first image signal may be considerably removed by a first filter 221. In another example, when the value of the division ratio N increases, the difference in the frequency may decrease. In this example, the removal of the first image signal by the first filter 221 may be more limited.

A distance between the second image signal and the signal band may be less than a distance between the first image signal and the signal band, however, the second filter 231 may have a high Q factor. Accordingly, an image may be further removed by the second filter. The second IRR may be determined based on an accuracy of a second frequency converter 230, and the accuracy of the second frequency converter 230 may be in proportion to the second local oscillation signal. For example, when the frequency of the second local oscillation signal is reduced due to an increase in the value of the division ratio N, the second IRR may increase. When the value of the division ratio N decreases, the second IRR may be degraded.

As described above, an image rejection performance may be determined based on the value of the division ratio N, and an optimum value of the division ratio N may be determined based on a circuit structure, a performance, and a channel environment. Thus, the sliding IF receiver may optimize the image rejection performance, by optimally adjusting the value of the division ratio N based on a performance of a reception structure and a channel environment.

Hereinafter, a removal of a first image signal and a second image signal will be further described with reference to FIGS. 8 and 9.

Figure 8:
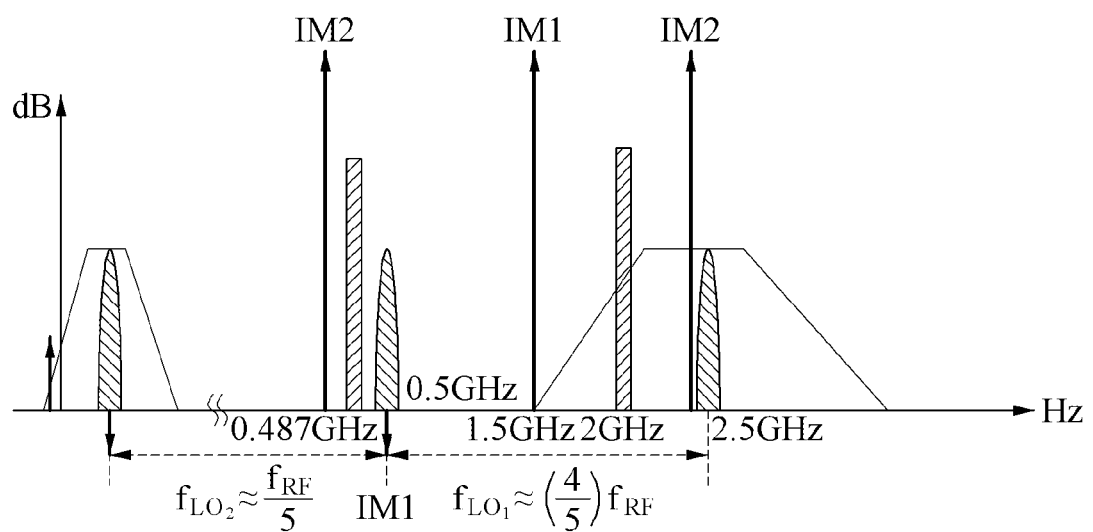
FIGS. 8 and 9 are diagrams illustrating examples of removing an image signal based on a division ratio in a sliding IF receiver.
Figure 9:
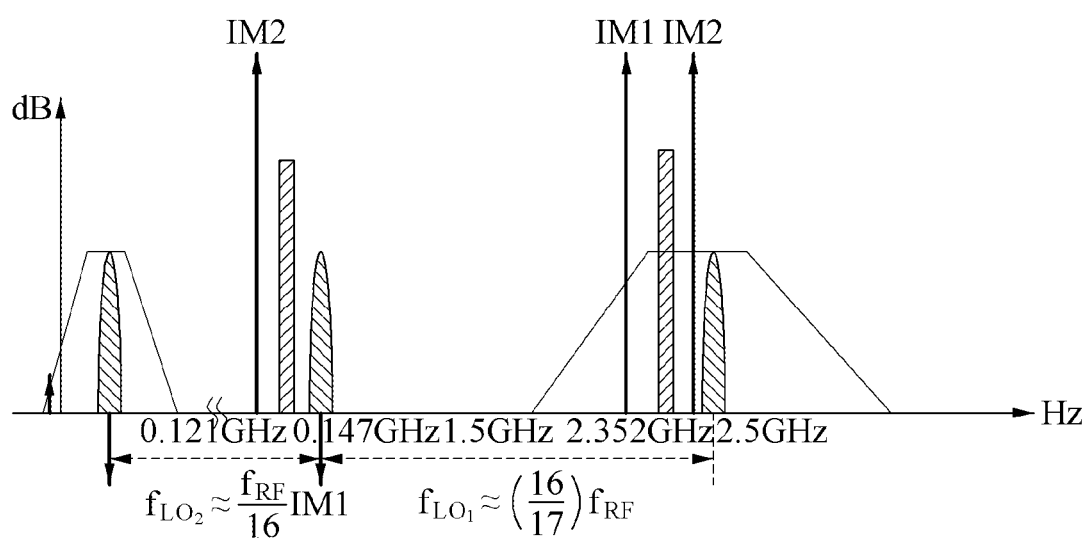

FIGS. 8 and 9 are diagrams illustrating examples of removing an image signal based on a division ratio in a sliding IF receiver.

In an example, when a value of a division ratio N increases, a difference between frequencies $f_{LO1}$ and $f_{RF}$ may decrease and accordingly, a first IRR of a first filter 221 may decrease. When a frequency $f_{LO2}$ decreases, a quality of a second IF signal may be enhanced, which may lead to an increase in a second IRR.

In another example, when the value of the division ratio N decreases, the difference between the frequencies $f_{LO1}$ and $f_{RF}$ may increase and accordingly, the first IRR may increase. When the frequency $f_{LO2}$ increases, the quality of the second IF signal may be degraded and accordingly, the second IRR may decrease. As described above, a filter performance required for a first filter and a second filter may be determined based on a state of an image signal (for example, a magnitude of each of a first image signal and a second image signal, and the like). Accordingly, a value of the division ratio N required in the sliding IF receiver may be changed.

FIG. 8 illustrates a channel environment in which the division ratio N is set to "4," and FIG. 9 illustrates a channel environment in which the division ratio N is set to "16." In FIGS. 8 and 9, a frequency $f_{RF}$ of an input signal is set to 2.5 gigahertz (GHz).

To describe a process of filtering an input signal, FIGS. 5 through 7 are compressed for an example of the division ratio N of "4," and an example of the division ratio N of "16," in FIGS. 8 and 9, respectively. In each of FIGS. 8 and 9, filtering of the input signal may be performed sequentially from a right side to a left side.

In the example of FIG. 8 in which the division ratio N is set to "4," a first image signal $IM_1$ is generated at about 1.5 GHz. In the example of FIG. 9 in which the division ratio N is set to "16," a first image signal $IM_1$ is generated at about 2.352 GHz. The first IRR in the example of FIG. 8 may be greater than the first IRR in the example of FIG. 9.

In the example of FIG. 8, a first IF signal is generated at a frequency fine of about 0.5 GHz. In the example of FIG. 9, a first IF signal is generated at a frequency fine of about 0.147 GHz. A second local oscillation signal in the example of FIG. 9 has a low frequency $f_{LO2}$, in comparison to the example of FIG. 8. Accordingly, a second IRR of a second filter in the example of FIG. 9 may be higher than a second IRR of a second filter in the example of FIG. 8. The second filter may be configured to perform filtering on a BB.

Figure 10:
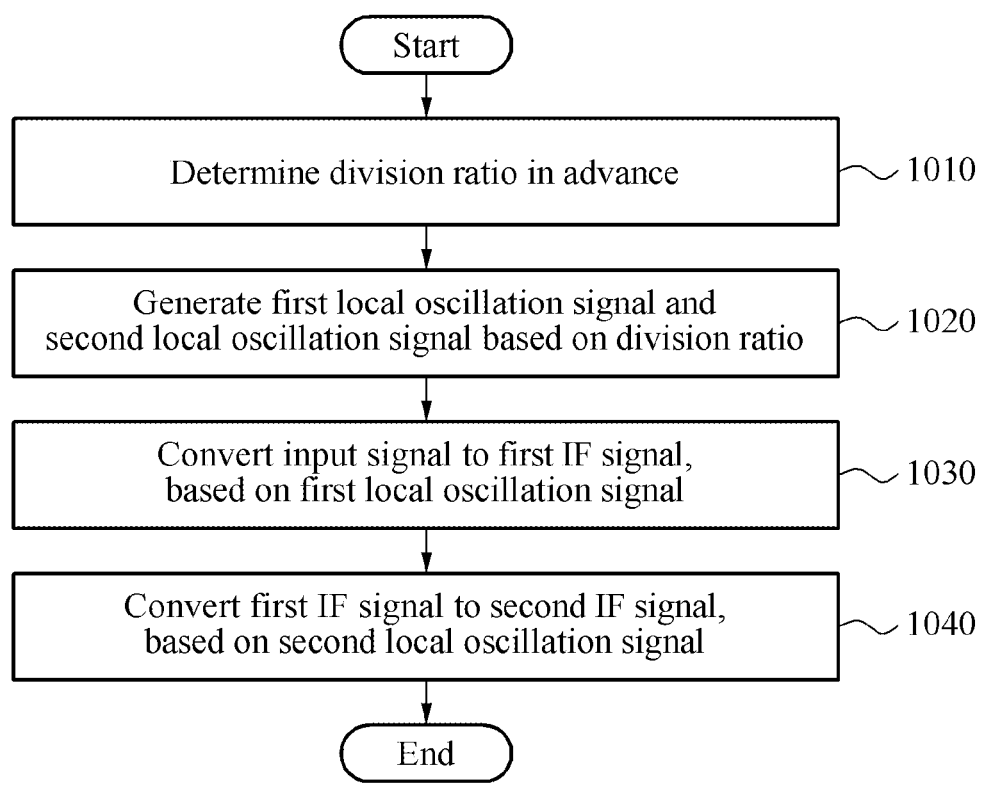
FIG. 10 is a flowchart illustrating an example of a sliding IF reception method.

FIG. 10 is a flowchart illustrating an example of a sliding IF reception method.

Referring to FIG. 10, in operation 1010, an oscillation controller determines a division ratio in advance. In an example, the oscillation controller may determine a division ratio so that an amount of power to be consumed by the sliding IF receiver may be less than a predetermined power threshold. In this example, the predetermined power threshold may be, for example, a value set to minimize power consumption in a sliding IF receiver. In another example, the oscillation controller may determine a division ratio so that an error rate of a signal obtained by processing a received input signal may be less than a predetermined threshold error rate. In this example, the predetermined threshold error rate may be, for example, a value set to minimize an error. In still another example, when an interference detector detects an interference signal, the oscillation controller may determine a division ratio, based on the interference signal.

In operation 1020, an oscillator generates a first local oscillation signal and a second local oscillation signal, based on the division ratio. For example, the oscillator may divide the first local oscillation signal at the division ratio, to generate the second local oscillation signal.

In operation 1030, a first frequency converter converts an input signal to a first IF signal, based on the first local oscillation signal. For example, a first filter may perform filtering on the received input signal in a predetermined band, and the first frequency converter may convert the filtered input signal to the first IF signal.

In operation 1040, a second frequency converter converts the first IF signal to a second IF signal, based on the second local oscillation signal. For example, a second filter may perform filtering on the second IF signal in a BB.

In an example, the sliding IF receiver may improve a performance of a signal-to-noise ratio (SNR) of a final signal, by generating a local oscillation signal based on an optimum division ratio. The final signal may be, for example, a signal obtained by filtering the second IF signal and converting the signal to a digital signal. Additionally, the sliding IF receiver may secure an optimum image performance, based on an image rejection characteristic of each filter, by selecting an appropriate division ratio. The sliding IF receiver may provide optimum power consumption and optimum reception sensitivity.

Figure 11:
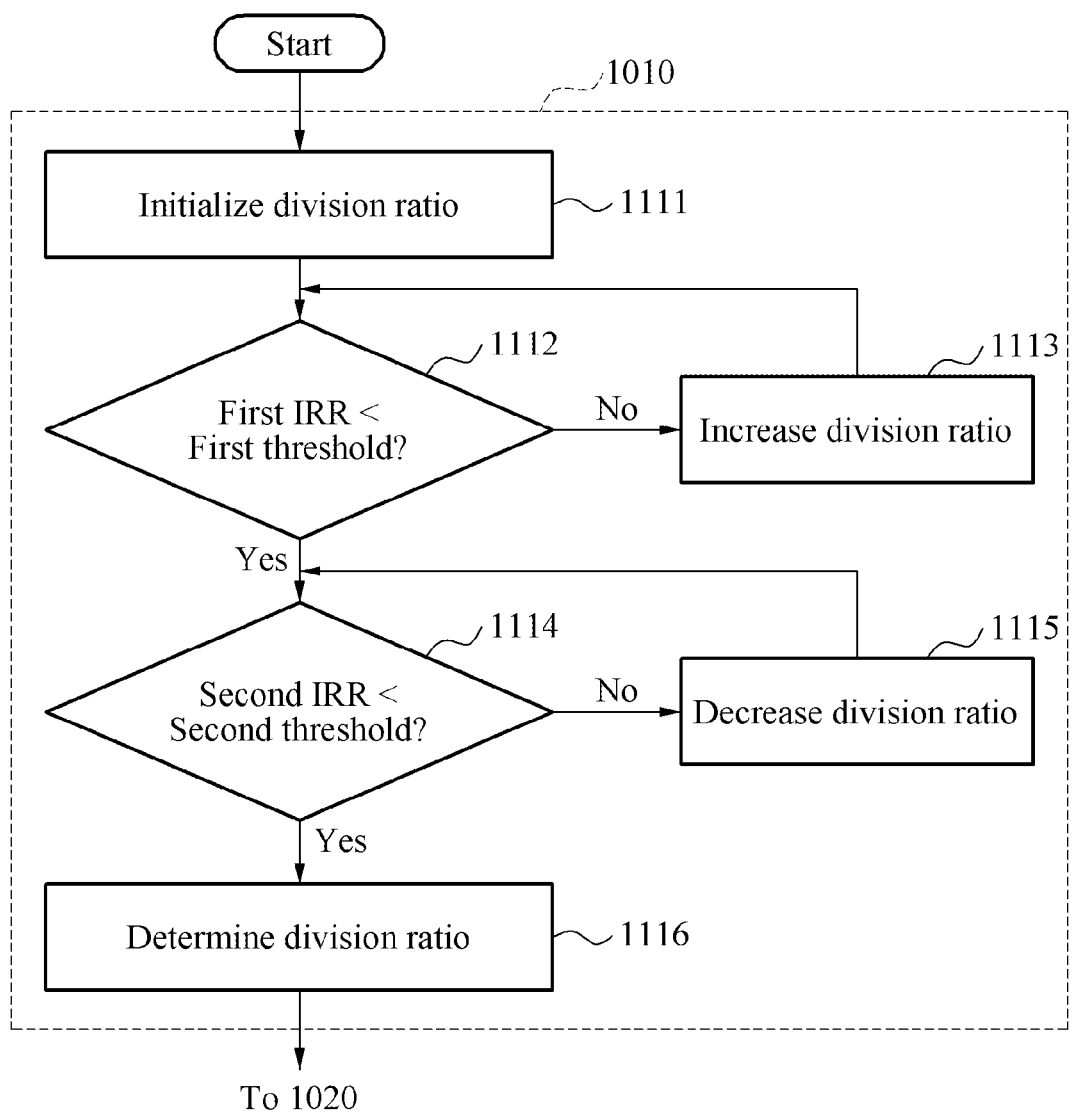
FIG. 11 is a flowchart illustrating an operation of determining a division ratio corresponding to an optimum power requirement in the sliding IF reception method of FIG. 10.

FIG. 11 is a flowchart illustrating an operation of determining a division ratio corresponding to an optimum power requirement in the sliding IF reception method of FIG. 10.

FIG. 11 illustrates operation 1010 of FIG. 10 to determine a division ratio corresponding to an optimum power requirement.

Referring to FIG. 11, in operation 1111, the oscillation controller initializes the division ratio. For example, the oscillation controller may set the division ratio to an arbitrary integer, for example, one of integers of "0" to "Nmax." Nmax corresponds to a maximum value of the division ratio.

In operation 1112, the oscillation controller determines whether a first IRR is less than a first threshold. The first threshold may refer to a maximum IRR of a first image signal set to minimize power consumption. For example, the oscillation controller may determine the first IRR from the first image signal detected by the interference detector, and may compare the first IRR to the first threshold.

When the first IRR is determined to be equal to or greater than the first threshold, the oscillation controller increases the division ratio in operation 1113. For example, the oscillation controller may increase the division ratio by a preset value (for example, one of integers of "1" to "Nmax"). The oscillation controller may repeatedly perform operations 1112 and 1113 until the first IRR is reduced to a value less than the first threshold.

In operation 1114, the oscillation controller determines whether a second IRR is less than a second threshold. The second threshold may refer to a maximum IRR of a second image signal set to minimize power consumption. For example, the oscillation controller may determine the second IRR from the second image signal detected by the interference detector, and may compare the second IRR to the second threshold.

When the second IRR is determined to be equal to or greater than the second threshold, the oscillation controller decreases the division ratio in operation 1115. For example, the oscillation controller may decrease the division ratio by a preset value (for example, one of integers of "1" to "Nmax"). The oscillation controller may repeatedly perform operations 1114 and 1115 until the second IRR is reduced to a value less than the second threshold.

In operation 1116, the oscillation controller determines the division ratio. For example, the oscillation controller may determine the division ratio so that the second IRR may be less than the second threshold. Thus, it is possible to optimize power consumption based on the second IRR.

Figure 12:
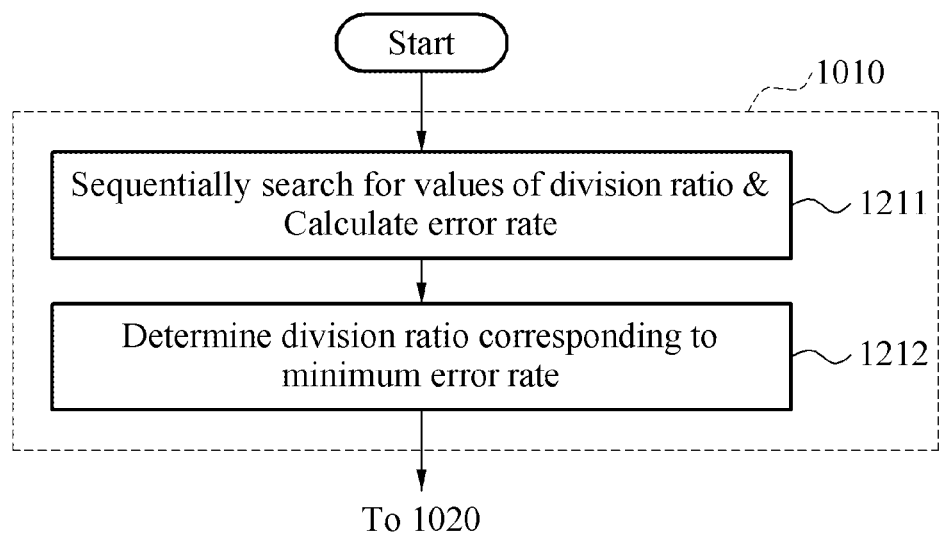
FIG. 12 is a flowchart illustrating an operation of determining a division ratio corresponding to the sliding IF reception method of FIG. 10.

FIG. 12 is a flowchart illustrating an operation of determining a division ratio corresponding to the sliding IF reception method of FIG. 10.

FIG. 12 illustrates operation 1010 of FIG. 10 to determine a division ratio corresponding to a best performance.

Referring to FIG. 12, in operation 1211, the oscillation controller sequentially searches for values of the division ratio, and calculates an error rate. For example, the oscillation controller may measure error rates for each value of the division ratio while increasing the division ratio sequentially from an initial value (for example, "1") to a predetermined value (for example, "Nmax"). The error rates may include, for example, a BER, a PER, and other error rates known to one of ordinary skill in the art.

In operation 1212, the oscillation controller determines a division ratio corresponding to a minimum error rate. For example, the oscillation controller may determine, as a division ratio, a value corresponding to a minimum error rate among the measured error rates. As a result, the oscillation controller may determine a division ratio N corresponding to a minimum BER by sweeping the entire range of the division ratio N.

Additionally, a relationship between the value of the division ratio N and a BER of a final signal obtained by processing the input signal may be represented in Equations 4 and 5 shown below.

$$P_{IM1} - IMR_1 - Margin > CNR \qquad \text{Equation 4}$$

$$P_{IM2} - IMR_2 - Margin > CNR \qquad \text{Equation 5}$$

In Equations 4 and 5, $P_{IM1}$ corresponds to a magnitude of the first image signal, $P_{IM2}$ corresponds to a magnitude of the second image signal, $IMR_1$ corresponds to a first IRR, $IMR_2$ corresponds to a second IRR, Margin corresponds to a margin, and CNR corresponds to a carrier-to-noise ratio.

When the magnitude $P_{IM1}$ of the first image signal including the margin is greater than a CNR required by a final terminal of the sliding IF receiver, it may be advantageous to increase the division ratio N to obtain better performance of the sliding IF receiver. Additionally, instead of the CNR, a BER and a PER may be used. Additionally, when the magnitude $P_{IM2}$ of the second image signal including the margin is greater than the CNR, it may be advantageous to decrease the division ratio N to obtain better performance of the sliding IF receiver.

In an example, when a magnitude of a first image signal included in a signal obtained by filtering a first IF signal is greater than a predetermined CNR, the oscillation controller may increase the division ratio. In another example, when a magnitude of a second image signal included in a signal obtained by filtering a second IF signal is greater than the predetermined CNR, the oscillation controller may decrease the division ratio.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices, and the like. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly other implementations are within the scope of the following claims.

What is claimed is:

1. A sliding intermediate frequency (IF) reception method, comprising:
    generating a first local oscillation signal and a second local oscillation signal, based on a division ratio determined in advance of a frequency of the first local oscillation signal to a frequency of the second local oscillation signal, wherein the generating of the first local oscillation signal and the second local oscillation signal comprises
        increasing the division ratio when a first image rejection ratio (IRR) of a first IF signal is equal to or greater than a first threshold, and
        decreasing the division ratio when a second IRR of a second IF signal is equal to or greater than a second threshold;
    converting a received input signal to the first IF signal, based on the first local oscillation signal; and
    converting the first IF signal to the second IF signal, based on the second local oscillation signal.

2. The sliding IF reception method of claim 1, wherein the generating of the first local oscillation signal and the second local oscillation signal further comprises:
    determining the division ratio so that an amount of power to be consumed by a sliding IF receiver is less than a threshold power.

3. The sliding IF reception method of claim 1, wherein the generating of the first local oscillation signal and the second local oscillation signal further comprises:
    initializing the division ratio prior to increasing or decreasing the division ratio.

4. The sliding IF reception method of claim 1, wherein the generating of the first local oscillation signal and the second local oscillation signal further comprises:
    determining the division ratio so that an error rate of a signal obtained by processing the received input signal is less than a threshold error rate.

5. The sliding IF reception method of claim 1, wherein the generating of the first local oscillation signal and the second local oscillation signal further comprises:
    measuring error rates for each value of the division ratio while increasing the division ratio sequentially from a first value to a second value; and
    determining, as the division ratio, a value corresponding to a minimum error rate among the measured error rates.

6. The sliding IF reception method of claim 1, wherein the generating of the first local oscillation signal and the second local oscillation signal further comprises:
    detecting an interference signal; and
    determining the division ratio, based on the interference signal.

7. A sliding intermediate frequency (IF) reception method, comprising:
    generating a first local oscillation signal and a second local oscillation signal, based on a division ratio determined in advance of a frequency of the first local oscillation signal to a frequency of the second local oscillation signal, wherein the generating of the first local oscillation signal and the second local oscillation signal comprises
        increasing the division ratio when a magnitude of a first image signal included in a signal obtained by filtering a first IF signal is greater than a carrier-to-noise ratio (CNR), and
        decreasing the division ratio when a magnitude of a second image signal included in a signal obtained by filtering a second IF signal is greater than the CNR;
    converting a received input signal to the first IF signal, based on the first local oscillation signal; and
    converting the first IF signal to the second IF signal, based on the second local oscillation signal.

8. The sliding IF reception method of claim 1, wherein the generating of the first local oscillation signal and the second local oscillation signal further comprises:
    dividing the first local oscillation signal at the division ratio, to generate the second local oscillation signal.

9. The sliding IF reception method of claim 1, wherein the converting of the received input signal to the first IF signal comprises:
    performing filtering on the received input signal in a band; and
    converting the filtered received input signal to the first IF signal.

10. The sliding IF reception method of claim 1, wherein the converting of the first IF signal to the second IF signal comprises:
    performing filtering on the second IF signal in a base band (BB).

11. A sliding intermediate frequency (IF) receiver, comprising:
    an oscillator configured to generate a first local oscillation signal and a second local oscillation signal, based on a division ratio determined in advance of a frequency of the first local oscillation signal to a frequency of the second local oscillation signal;

a first frequency converter configured to convert a received input signal to a first IF signal, based on the first local oscillation signal;

a second frequency converter configured to convert the first IF signal to a second IF signal, based on the second local oscillation signal; and an oscillation controller configured to increase the division ratio when a first image rejection ratio (IRR) of the first IF signal is equal to or greater than a first threshold, and to decrease the division ratio when a second IRR of the second IF signal is equal to or greater than a second threshold.

12. The sliding IF receiver of claim 11,
wherein the oscillation controller is further configured to determine the division ratio so that an amount of power to be consumed in the sliding IF receiver is less than a threshold power.

13. The sliding IF receiver of claim 11,
wherein the oscillation controller is further configured to initialize the division ratio prior to increasing or decreasing the division ratio.

14. The sliding IF receiver of claim 11,
wherein the oscillation controller is further configured to determine the division ratio so that an error rate of a signal obtained by processing the received input signal is less than a threshold error rate.

15. The sliding IF receiver of claim 11,
wherein the oscillation controller is further configured to measure error rates for each value of the division ratio while increasing the division ratio sequentially from a first value to a second value, and to determine, as the division ratio, a value corresponding to a minimum error rate among the measured error rates.

16. The sliding IF receiver of claim 11,
an interference detector configured to detect an interference signal; and
wherein the oscillation controller is further configured to determine the division ratio based on the interference signal.

17. The sliding IF receiver of claim 11,
wherein the oscillation controller is further configured to increase the division ratio when a magnitude of a first image signal included in a signal obtained by filtering the first IF signal is greater than a carrier-to-noise ratio (CNR), and to decrease the division ratio when a magnitude of a second image signal included in a signal obtained by filtering the second IF signal is greater than the CNR.

18. The sliding IF receiver of claim 11, wherein the oscillator comprises a divider configured to divide the first local oscillation signal at the division ratio, to generate the second local oscillation signal.

19. The sliding IF receiver of claim 11, further comprising:
a first filter configured to perform filtering on the received input signal in a band; and
a second filter configured to perform filtering on the second IF signal in a base band (BB).

20. The sliding IF receiver of claim 11, wherein the second frequency converter comprises:
an in-phase converter configured to convert the first IF signal to an in-phase signal; and
a quadrature converter configured to convert the first IF signal to a quadrature signal, and
wherein the second IF signal comprises the in-phase signal and the quadrature signal.

* * * * *